United States Patent
Horwath et al.

(10) Patent No.: US 10,386,549 B2
(45) Date of Patent: Aug. 20, 2019

(54) PRISM, PARTICULARLY FOR OPTICAL DATA COMMUNICATION

(71) Applicant: Deutsches Zentrum für Luft- und Raumfahrt e.V., Köln (DE)

(72) Inventors: Joachim Horwath, Gilching (DE); Dirk Giggenbach, Pürgen (DE)

(73) Assignee: Deutsches Zentrum für Luft- und Raumfahrt e.V., Köln (DE)

(*) Notice: Subject to any disclaimer, the term of this patent is extended or adjusted under 35 U.S.C. 154(b) by 43 days.

(21) Appl. No.: 15/406,317

(22) Filed: Jan. 13, 2017

(65) Prior Publication Data

US 2017/0131441 A1 May 11, 2017

Related U.S. Application Data

(63) Continuation of application No. 14/432,898, filed as application No. PCT/EP2013/069263 on Sep. 17, 2013, now abandoned.

(30) Foreign Application Priority Data

Oct. 1, 2012 (DE) .................. 10 2012 217 954

(51) Int. Cl.
    *G02B 1/11* (2015.01)
    *G02B 5/04* (2006.01)

(52) U.S. Cl.
    CPC . *G02B 5/04* (2013.01); *G02B 1/11* (2013.01)

(58) Field of Classification Search
    CPC ..................................... G02B 5/04; G02B 1/11
    USPC ..................... 359/891, 833, 834, 835, 837
    See application file for complete search history.

(56) References Cited

U.S. PATENT DOCUMENTS

| 4,634,223 A | 1/1987 | Ishii |
| 6,002,473 A * | 12/1999 | West ............... G01C 15/00 356/153 |
| 2005/0195879 A1 | 9/2005 | Ishizu |

(Continued)

FOREIGN PATENT DOCUMENTS

| GB | 586 392 A | 3/1947 |
| WO | 2006/133458 A2 | 12/2006 |
| WO | 2013/045699 A1 | 4/2013 |

OTHER PUBLICATIONS

International Search Report for corresponding patent application No. PCT/EP2013/069263 dated Dec. 6, 2013.

(Continued)

*Primary Examiner* — Jade R Chwasz
(74) *Attorney, Agent, or Firm* — Renner, Otto, Boisselle & Sklar, LLP

(57) ABSTRACT

The prism, which is used particularly for optical data communication by means of a modulated light beam, is furnished with a transmissive prism body (60) which has two triangular first side faces (69) on its outer side and a base surface (77) therebetween, and two second side faces rising up from the base surface and inclined toward one another as light incidence and light exit faces (74, 76). The two second side faces (74, 76) are inclined oppositely, relative to an axis (79) running parallel to the base surface (77) and penetrating the planes in which the first side faces (69) lie, and each run at an acute angle (78, 80) to the axis (79) such that reflection radiation is reflected to the side.

19 Claims, 1 Drawing Sheet

(56) References Cited

U.S. PATENT DOCUMENTS

2007/0258246 A1 11/2007 Leatherdale et al.
2011/0032961 A1 2/2011 Zang

OTHER PUBLICATIONS

Meyers Großes Konversations—Lexikon, "Prisma", vol. 16, p. 354, Dec. 31, 1908, Internet http://www.zeno.org/nid/20007289723.
Naumann, H. et al.; Bauelemente der Optik. 6$^{th}$ edition, 1992, pp. 180-181, ISBN: 3-446-17036-7.
LINOS catalog of 2005/2006, p. 95.

* cited by examiner

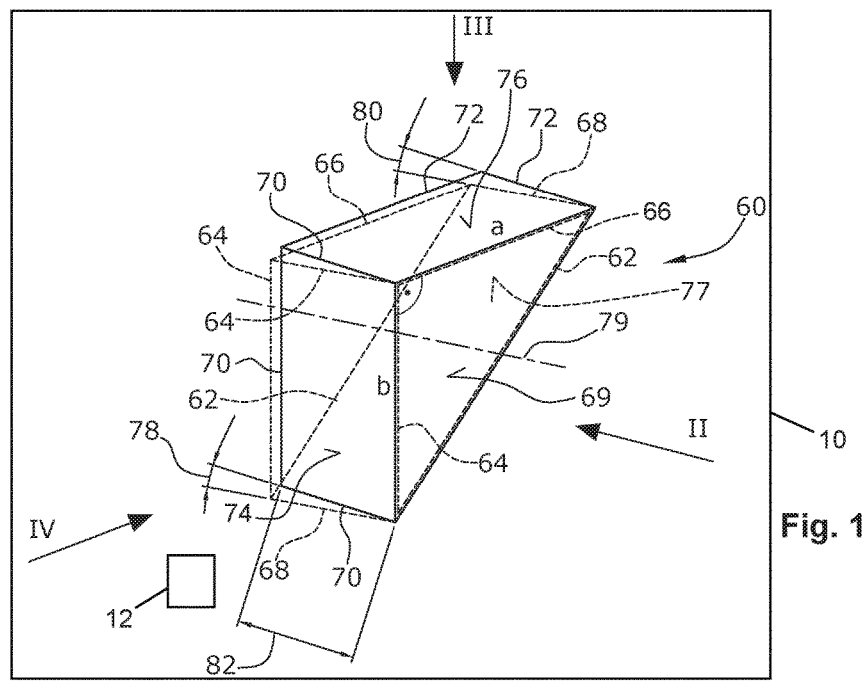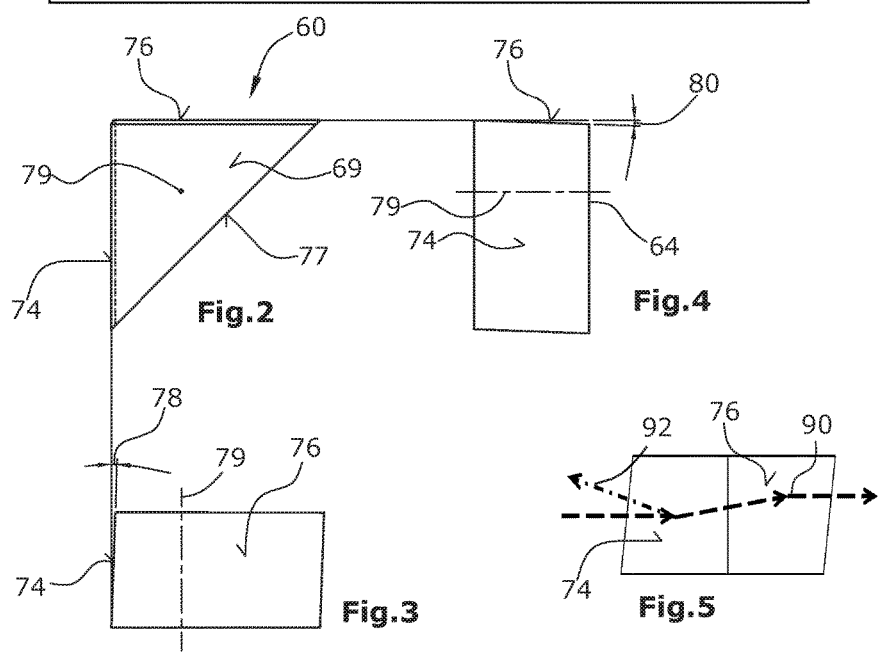

PRISM, PARTICULARLY FOR OPTICAL DATA COMMUNICATION

This application is a continuation of U.S. patent application Ser. No. 14/432,898 filed Apr. 1, 2015, which is a national phase of International Application No. PCT/EP2013/069263 filed Sep. 17, 2012, which claims priority of German Patent Application No. 10 2012 217 954.2 filed on Oct. 1, 2012, which are hereby incorporated herein by reference in their entirety.

The invention relates to a prism for deflection of electromagnetic waves, and particularly a prism for optical data communication by means of a modulated light beam.

Prisms for deflection of electromagnetic waves are known in a large variety of technical fields. In the normal case, a prism comprises a transmissive prism body which in lateral view is triangular. Between the two triangular first side faces of the prism body, the latter comprises a base surface and two second side faces extending up from the base surface, said second side faces bordering on each other opposite to the base surface. Normally, these two second side faces are, on the one hand, the light incidence face and, on the other hand, the light exit face of the prism.

In prisms, it is generally known that these can comprise a pyramidal error. A pyramidal error is defined to denote faulty positions of the base surface and the side faces (i.e. the light incidence and light exit faces) of a prism which cause the prism to assume the shape of a plate separated from out of the prism. (As to the definition of pyramidal errors, see e.g. NAUMANN, H.; SCHRÖDER, G.: Bauelemente der Optik. 6th edition, 1992, pp. 180-181, ISBN: 3-446-17036-7). As evident particularly from picture 5.7.19 of this publication, the side faces of the prism are wrongly inclined in the same sense, notably toward each other, so that their extensions will converge in upward directions to form the tip of a pyramid.

So-called reflection prisms for deflection of light beams, preferably with low expenditure for adjustment as compared to mirrors, are known e.g. from the LINOS catalog of 2005/2006, p. 95.

In order to deflect a light beam with the aid of prism while being able to select among various deflection angles, there is required a relative movement between the light incidence face of the prism and the light beam. In most cases, this is realized in that the prism is rotatable about an axis which extends substantially parallel to the base surface and penetrates the two first side faces of the prism body.

In dependence on the current constellation in a given situation, cases may occur where the light beam is incident on the light incidence surface under a right angle, i.e. vertically, and respectively will exit from the light exit surface vertically, i.e. in the direction of the normal line. In both cases, back reflections will occur on the light incidence surface and respectively the light exit surface. This can be minimized by an anti-reflective coating or another design of said surfaces. However, back reflections cannot be entirely prevented.

Back reflections of the type described above will cause a reduction of the energy of the light beam passed through the prism. In situations where the light beam is modulated, as will be the case in optical data communication, back reflections toward the transmitter will lead to disturbances of the data communication.

It is an object of the invention to provide a prism in which the extent of disturbing back reflection is further reduced.

To achieve the above object, the invention provides a prism, particularly for optical data communication by means of a modulated light beam, comprising
a transmissive prism body which has two triangular first side faces on its outer side and, between said first side faces, a base surface and two second side faces rising up from the base surface and inclined toward one another as light incidence and light exit faces,
said second side faces being inclined oppositely, relative to an axis running parallel to the base surface and penetrating the planes in which the first side faces lie, and each running at an acute angle to the axis in such a manner that reflection radiation is reflected to the side.

Thus, according to the invention, the prism is provided with second side faces which are tilted oppositely and substantially under identical angles and respectively are laterally inclined, which is to say that the light incidence face and the light exit face are laterally tilted oppositely to each other. Thereby, the reflected portion of the incident light beam will not travel back exactly in the opposite direction to the direction of propagation of the light beam but will be deflected under an acute angle oppositely to this direction, and thus will not disturb the optical system emitting the beam. This is of advantage particularly in optical data communication which is performed by use of modulated light beams. Said lateral tilting in opposite direction has the advantage that the unavoidably generated lateral deflection upon entry of the light beam into the prism will be compensated again when the light beam is exiting from the prism, i.e. that there will occur a lateral parallel displacement of the beams.

The reduction and respectively elimination of back reflection on the light incidence side and respectively on the light exit side could be obtained e.g. also in that the direction of propagation of the light beam together with that axis which extends parallel to the base surface and through the two planes in which the two first side faces of the prism are arranged, forms an angle deviating from a right angle. In other words, one could tilt the prism on the whole relative to the axis of light incidence. Then, however, it would not be possible anymore to achieve, at the light exit surface, a compensation for the lateral deflection of the light beam, except for a case where the light exit surface is tilted oppositely to the angle of inclination between the light beam and the light incidence surface. The scope of the invention also covers a prism design and a relative arrangement with respect to the direction of the incident light beam wherein no parallel displacement will occur.

According to an advantageous embodiment of the invention, it can further be provided that the two second side faces of the prism body, i.e. the light incidence surface and the light exit surface, are anti-reflective and respectively are designed to the effect that they dampen reflections.

According to a further advantageous embodiment of the invention, it is provided that the respective acute angle of inclination is in the range from a few ¹/₁₀ angular degrees up to angular degrees in the lower two-digit range, preferably from an angular degree of 0.1 to 15 angular degrees, and with particular preference from 2 angular degrees to 5 angular degrees.

The concept, provided by the invention, of a mutual tilting of the light incidence surface and the light exit surface against the beam direction can be applied in prism bodies which in lateral view represent an equilateral right-angled triangle or, however, an irregular triangle.

Thus, to sum up, the underlying problem to be solved by the invention and the solution provided by the invention can be described as follows:

Depending on the tilting angle of the prism, the light beam which is to be passed through the prism and in the given case is to be deflected, can impinge vertically onto the light-incidence surface of the prism and respectively exit vertically from the light exit surface of the prism. Understandably, in the process, there will unavoidably occur back reflections into the transmitter, which is disadvantageous particularly in the modulated light beams or light bundles used in optical communication technology. Therefore, according to an advantageous embodiment of the invention, it is proposed that the transmissive component of the optical deflection element comprises a light incidence surface and a light exit surface which, for minimizing the effects of back reflections of radiation impinging on the light incidence surface and/or of radiation exiting through the light exit surface, are oppositely tilted around the tilting axis and each extend at a right angle relative to the tilting axis, wherein reflection radiation will be reflected to the side.

By the lateral, oppositely directed tilting of the light incidence and light exit surfaces, it is achieved, on the one hand, that the unavoidably generated reflections of the reflected electromagnetic waves will not return back into the transmitter but will be reflected to the side and, on the other hand, the opposite directionality of the tilted configuration makes it possible that there will occur only a parallel displacement of the beam relative to the aperture but not a tilting of the radiation bundle in the tilting direction of the surfaces.

This measure can of course be combined with a design of the light incidence and light exit surfaces which leads to a reduced reflection and increased transmission. Such measures are generally known e.g. in the form of antireflection coatings in prisms.

Depending on the tolerated overall site of the prism, the lateral angle of inclination of the above mentioned surfaces of the prism can assume any conceivable value so that the angle of inclination is an acute angle. However, the larger the angle of inclination is, the wider the prism has to become so as to be able to transport light in a quantity corresponding to the light-beam aperture. In regard to a miniaturization of the prism and its geometrical dimensions and, thus, in regard to a light-weighted and small-sized design of the prism, it is of advantage if the angle comprises only a few degrees. Here, angles of inclination from e.g. an angular degree of ⅒ to angular degrees in the lower two-digit range, particularly from an angular degree of 0.2 to an angular degree of 15 and especially from an angular degree of 0.2 to an angular degree of 5 and respectively 10, are possible.

The prism according to the invention can be used generally in all optical applications where, already today, use is made of prisms for the deflection of light beams and respectively the processing of light beams. The use of the prism of the invention is of particular advantage of optical data communication and preferably in a so-called Coarse Pointing Assembly (CPA) unit as described e.g. in PCT/EP2012/069354, the content of which is herewith included in the subject matter of the present patent application by way of reference.

The invention will be described in greater detail hereunder by way of an exemplary embodiment and with reference to the drawing. In particular, FIG. 1 shows perspective/diagrammatical view of an optical system including a prism according to an exemplary embodiment of the invention for illustration of the mutual tilting of the light incidence and light exit surfaces.

FIGS. 2 to 4 show lateral views of the prism of FIG. 1.

FIG. 5 shows a schematic representation of a top view of the prism of FIG. 1 including a schematic representation of reflection radiation that is reflected along an axis.

In FIGS. 1 to 4, a design of the prism of the invention is shown as by way of an exemplary embodiment. FIG. 1 illustrates an optical system 1 (e.g., a CPA as discussed above and described in PCT/EP2012/069354) (shown as a schematic block) that includes a transmitter 12 (e.g., an optical system transmitting the beam as discussed above) (shown as a schematic block) and a prism 60 according to this design in perspective view. By the edges 62, 64, 66 and 68, represented in dashed lines extending in parallel in a pair-wise and respectively group-wise manner, there is shown a regular prism body having triangular lateral faces 69. (Depicted in this embodiment is the special case of a isosceles rectangular triangle.) The continuous lines 70 and 72 indicate those edge contours which delimit the light incidence surface 74 and the light exit surface 76 (apart from the delimiting edges shown in continuous lines at 66 and 64). These two surfaces 74,76 extend from the base surface 77 of the prism. It can be seen that the light incidence surface 74 is inclined relative to the axis 79 by an angle of inclination 78 while the light exit surface 76 is inclined by an angle 80 of the same amount but oppositely to the inclination of light incidence surface 74. This is also shown in the lateral views of FIGS. 2 to 4. In the present exemplary embodiment, the angle of inclination of both surfaces 74,76 is two angular degrees but can also be larger while, however, in the latter case the width 82 of the prism 60 would have to be enlarged so as to still be able to conduct and capture the light beam across it's the whole aperture of the prism.

The opposing inclination of the light incidence and exit surfaces 74,76 is favorable for minimizing the disturbances caused by back reflection which occur particularly under such angles of inclination of the prism 60 where the light beam is incident vertically at least on one of the two surfaces. The reflections generated on the light incidence and respectively exit surfaces 74,76 which act like mirror surfaces will be deflected oppositely to the direction of incidence and (slightly) to the side, i.e. they will not travel back to the transmitter, which is to say they will travel at an acute angle to the direction from which the incident rays come. Thus, the reflected beams can be masked out by optical elements such as e.g. apertures or the like.

FIG. 5 schematically illustrates the light beam 90 with a long-dashed line entering the light incidence surface 74 and exiting the light exit surface 76. Also, a back reflection 92 being deflected to the side is schematically represented by a dash-dotted line.

The invention claimed is:

1. A prism, for optical data communication by means of a modulated light beam, comprising
   a transmissive prism body which has two triangular first side faces on its outer side and, between said first side faces, a base surface and two second side faces rising up from the base surface and inclined toward one another as light incidence and light exit faces for an optical path through the transmissive prism body,
   an axis running parallel to the base surface and penetrating the planes in which the first side faces lie,
   one of the second side faces running from one of the first side faces away from the axis, and the other of the second side faces running from the one of the first side faces toward the axis such that said second side faces are inclined oppositely, relative to the axis, wherein each second side face runs at an acute angle of an identical amount to the axis in such a manner that reflection radiation is reflected such that the reflection radiation would have a vector component extending along the axis, and wherein when a light incidence beam parallel to one of the triangular first side faces is transmitted to the light incidence face, a part of the light incidence beam is reflected, in a first direction not parallel to said first triangular first side face, as a reflection beam where a vector component of the reflection beam extends along the axis, and a further part of the light incidence beam enters, as a transmission beam, through the light incidence face into the transmissive prism body and, at the light incidence face, is refracted toward the base surface of the transmissive prism body and, at the base surface of the transmissive prism body, is reflected toward the light exit face and is refracted at the light exit face and, with lateral offset along the axis relative to the light incidence beam, exits from the light exit face.

2. The prism according to claim 1, wherein the second side faces are anti-reflective.

3. The prism according to claim 1, wherein the respective acute angle of inclination is in the range from a few $1/10$ angular degrees to a few tens of angular degrees.

4. The prism according to claim 1, wherein the second side faces, when viewed in the projection onto one of the first side faces, extend at an angle of 90°.

5. The prism according to claim 4, wherein the second side faces, when viewed in the projection onto one of the first side faces, have the same length.

6. The prism according to claim 1, wherein the respective acute angle of inclination is in the range from an angular degree of 0.1 to 15 angular degrees.

7. The prism according to claim 1, wherein the respective acute angle of inclination is in the range from 2 angular degrees to 5 angular degrees.

8. The prism according to claim 1, wherein the respective acute angle of inclination is in the range from 0.1 angular degrees to 15 angular degrees.

9. The prism according to claim 8, wherein the respective acute angle of inclination is in the range from 2 angular degrees to 5 angular degrees.

10. A method of operating the prism according to claim 1, comprising:

impinging a first location of the light incidence face with the light incidence beam heading in a second direction; and deflecting the further part of the light incidence beam laterally, such that the further part of the modulated light beam has a vector component that extends along the axis whereby another part of the modulated light beam exits the light exit face at a second location that is laterally offset from the first location along the axis.

11. The method of claim 10, wherein the another part of the modulated light beam exits the light exit face in a third direction that is offset from and parallel to the second direction.

12. The method of claim 10, wherein a first part of the reflection radiation is reflected by the one of the second side faces toward the plane in which one of the first side faces lies whereby a vector component of the first part of the reflection radiation extends along the axis, and wherein a second part of the reflection radiation is reflected by the other second side toward the plane in which the other first side face lies whereby a vector component of the second part of the reflection radiation extends along the axis.

13. The prism according to claim 1, wherein the axis is orthogonal to one of the first side faces.

14. An optical system comprising:

the prism according to claim 1, and a transmitter configured to transmit the light incidence beam to a first location of the light incidence face such that when the light incidence beam enters the light incidence face the further part of the light incidence beam is deflected laterally such that a vector component of the further part of the light incidence beam extends along the axis whereby the further part of the light incidence beam would exit the light exit face at a second location that is laterally offset from the first location along the axis.

15. The optical system of claim 14, where the optical system is a coarse pointing assembly.

16. The prism according to claim 14, wherein the respective acute angle of inclination is in the range from 2 angular degrees to 5 angular degrees.

17. The prism according to claim 14, wherein each respective acute angle of inclination relative to the axis is identical.

18. The prism according to claim 17, wherein the respective acute angle of inclination is in the range from 0.1 angular degrees to 15 angular degrees.

19. The prism according to claim 18, wherein the respective acute angle of inclination is in the range from 2 angular degrees to 5 angular degrees.

* * * * *